Patented Mar. 28, 1944

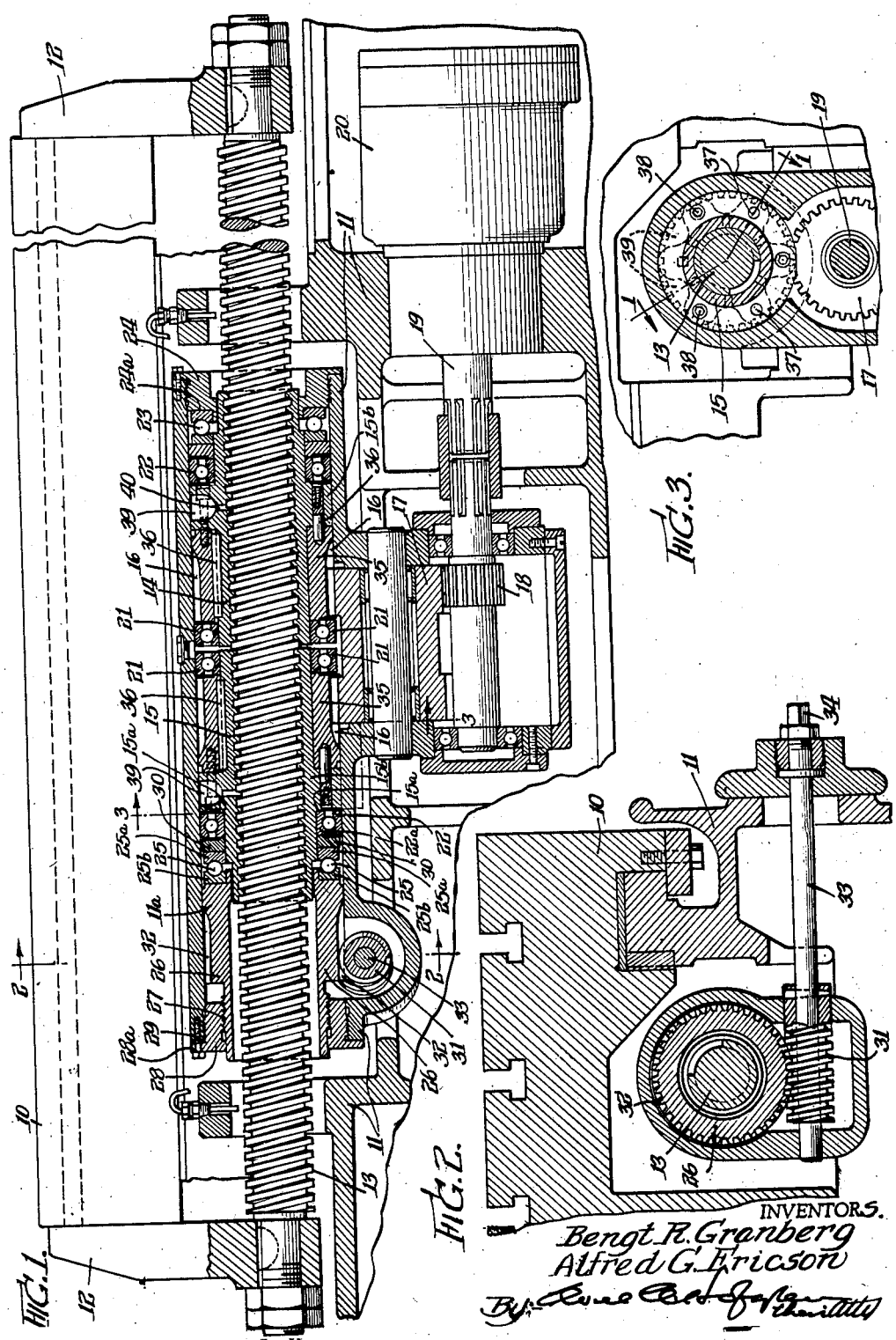

2,345,194

UNITED STATES PATENT OFFICE 2,345,194

FEED SCREW MECHANISM

Bengt R. Granberg and Alfred G. Ericson, Rockford, Ill., assignors to Sundstrand Machine Tool Co., Rockford, Ill., a corporation of Illinois Application January 9, 1942, Serial No. 426,160

3 Claims. (Cl. 74—441)

This invention relates generally to improvements in feeding mechanism for machine tool slides or work supports, and more particularly to an improved screw and nut device adjustable for eliminating lost motion or backlash between the parts.

It is the general object of the invention to provide a new and improved feed mechanism of the screw and nut type which is simple in construction and readily adjustable to effectually prevent lost motion between the parts during operation.

Another object of the invention is to provide an improved feed mechanism of the screw and nut type arranged to prevent lost motion or backlash during operation of the feed device in either direction.

A further object of the invention is to provide a feed mechanism of the screw and nut type in which the nut element includes two separate parts, both engaged with the screw element but spaced apart thereon and relatively adjustable along the axis of the screw for taking up backlash or lost motion, and in which the screw is fixed against rotation and the nuts are rotatably mounted between thrust bearings, one of which is fixed while the other is axially movable and provided with adjusting means for so moving it to eliminate backlash between the nuts and the screw.

Other objects and advantages will become apparent from the following description taken in connection with the accompanying drawing, in which:

Fig. 1 is a vertical section taken through the base or table of a milling machine at the axis of the lead screw and nuts of the feed mechanism.

Fig. 2 is a transverse detail section taken substantially as indicated at line 2—2 on Fig. 1, to show the adjusting means for taking up backlash.

Fig. 3 is a detail section taken substantially as indicated at line 3—3 on Fig. 1.

While there is shown in the drawing, and described herein, a preferred form of this invention as embodied in a screw and nut feed mechanism for actuating the work table of a milling machine, it is to be understood that the invention is not limited to the specific form or application thus disclosed, and that we intend to cover all modifications and alternative constructions falling within the scope of the invention, as expressed in the appended claims.

As illustrated in the drawing, the work table or slide 10 is mounted for reciprocation on the base or supporting frame of the machine, of which portions are seen at 11, and the table includes end brackets 12, 12 in which there is secured and anchored against rotation a lead screw 13. A pair of nuts 14 and 15 are journaled for rotation in the base 11 in threaded engagement with the lead screw 13 and each of said nuts is provided with gear teeth, indicated at 16, which mesh with the teeth of a pinion 17, the latter being an idler connecting the nuts with a driving gear 18. The shaft of the gear 18 is coupled directly to the drive shaft 19 of a motor 20. As shown, the teeth of the idler pinion 17 are interrupted at the middle portion of the pinion to provide adequate space for the ball bearings 21, 21 in which the inner ends of the nuts 14 and 15 are respectively journaled. Additional bearings 22, 22 are provided for the nuts adjacent their outer ends.

The nut 14 is furnished with a ball thrust bearing 23 which reacts between said nut and the transaxial shoulder 24$^a$ of a stop collar 24 secured in the base 11 of the machine. A ball thrust bearing 25 for the nut 15 reacts against an adjusting sleeve 26 which is disposed in coaxial relation to the lead screw 13 and surrounding it, said sleeve being suitably guided in the bore 11$^a$ of the base in which the journal bearings and thrust bearings just mentioned are accommodated. Adjacent its outer end the sleeve 26 is threaded at 27 and engages the internal threads of a collar 28 anchored in the base 11. As shown, the collar 28 is screwed into the end of the bore 11$^a$ with its flange 28$^a$ abutting the terminal shoulder of said bore and with an anchor screw 29 securing it in this position.

As a matter of convenience of construction, the nut 15 includes an enlarged portion intermediate its ends which provides a shoulder 15$^a$ against which the inner race 22$^a$ of the ball bearing 22 is lodged. A spacer ring 30 engages the opposite face of the race 22$^a$ and provides a seat for one raceway 25$^a$ of the thrust bearing 25. The opposite raceway 25$^b$ lodges against the inner end of the sleeve 26 so that axial adjustment of the sleeve 26 thus transmits pressure and movement through the thrust bearing 25 to the shoulder 15$^a$ and thus to the nut 15. By virtue of its threaded connection with the base 11 at 27, a slight rotation of the sleeve 26 will thus act to shift the nut 15 axially in a direction to take up any play or backlash between the threads of the nuts 14 and 15 and the threads of the lead screw 13. Such rotative adjustment of the sleeve 26 is effected by means of a manually operable worm or screw 31 meshing with suitably formed teeth 32 on the sleeve 26 and carried on the shaft 33 having a squared end 34 which is exposed at one side of the machine for actuation by any suitable form of removable crank or wrench.

While the adjustment of the nut 15 toward the nut 14 by means of the worm 31 and sleeve 26 will exert a compressive force along the axis of the feed screw 13 when the play or backlash has been taken up by such adjustment, it has been found that if the threads are chromium plated the coefficient of friction is so greatly reduced that this axial pressure may be permanently maintained without imposing an undue load on the drive mechanism and without any rapid deterioration of the threaded members through wear. Preferably, the chromium plating is applied to the threads of the lead screw 13 and the nuts 14 and 15 are made from a suitable quality of bearing bronze or other alloy. It is also an advantage of the present construction that the adjustment to take up backlash can be made while the machine is running and independently of the direction of operation. Thus the effect of the adjustment can be observed and it can be carried just far enough to take up the play without imposing an unduly severe frictional load on the threads of the feed mechanism.

As shown, the gear teeth 16 of the nuts 14 and 15 are formed in separate annular members 35 which are fitted tightly onto the nut members proper and anchored to them by means of keys 36, as seen in Fig. 1. This permits independent replacement of the threaded portions of the nuts or of the gear members 35 whenever the wear of either of said parts renders this desirable. The keys 36 are supplemented by pins 37 and securing screws 38 extending through the enlarged portions or flanges 15b of the nuts and into the ends of the gear members 35, as seen in Fig. 1. The flanges 15b are formed with pockets 39 from which lubricant is delivered to the threads of the screw 13 by way of ducts 40. The portions of Fig. 1 showing these features are taken as indicated at line I—I on Fig. 3, instead of at a strictly vertical plane like the remainder of the section.

We claim as our invention:

1. In a machine tool which includes a base, a slide mounted for reciprocation on said base, a lead screw secured to said slide against rotation, a pair of nuts spaced apart on the screw and provided with gear teeth thereon, and drive gearing including a common pinion engaged with both nuts to rotate them simultaneously in the same direction, the combination of a fixed thrust bearing between the outer end of one nut and the base, an axially movable thrust bearing positioned against the outer end of the other nut, a sleeve disposed around the screw and interposed between said movable bearing and the base, said sleeve having threaded engagement with the base and being provided with gear teeth, and a worm rotatably supported on the base and meshing with said teeth operable to rotate the sleeve for adjusting it axially and thereby shifting the movable nut axially along the screw toward the first nut to take up backlash between the screw and the nuts and place a portion of the screw between the nuts under compression.

2. In a machine tool which includes a base, a slide mounted for reciprocation on said base, a lead screw secured to said slide against rotation, a pair of nuts spaced apart on the screw and provided with gear teeth thereon, and drive gearing including a common pinion engaged with both nuts to rotate them simultaneously in the same direction, the combination of a fixed thrust bearing between the outer end of one of said nuts and the base, an axially movable thrust bearing positioned against the outer end of the other nut, means interposed between said movable thrust bearing and said base adjustable independently of the direction of rotation of the nuts to move said bearing axially and thereby shift one nut toward the other along the screw to take up backlash and place a portion of the screw between the nuts under compression.

3. In a machine tool which includes a base, a slide mounted for reciprocation on said base, a lead screw secured to said slide against rotation, and a pair of nuts disposed adjacent each other on the screw but spaced apart axially thereon, the combination of means to rotate said nuts simultaneously in the same direction comprising gear teeth on each of the nuts intermediate its ends and a common pinion engaging the gear teeth of both nuts and means to rotate said pinion, a journal bearing for each nut at its inner end adjacent the other nut and inwardly of the gear teeth, a second journal bearing for each nut adjacent its outer end, a pair of thrust bearings each reacting between the base and one of the outer journal bearings to prevent movement of said outer journal bearings away from each other, and means for adjusting one of said thrust bearings axially at will toward the other to shift one of the nuts toward the other and to take up backlash between the nuts and the screw and place the portion of the screw between the nuts under compression.

BENGT R. GRANBERG.
ALFRED G. ERICSON.